United States Patent [19]

Samulski

[11] 4,437,772

[45] Mar. 20, 1984

[54] LUMINESCENT DECAY TIME TECHNIQUES FOR TEMPERATURE MEASUREMENT

[76] Inventor: Thaddeus V. Samulski, 4013 Stilwell St., Pittsburgh, Pa. 15214

[21] Appl. No.: 213,827

[22] Filed: Dec. 8, 1980

Related U.S. Application Data

[63] Continuation-in-part of Ser. No. 73,841, Sep. 10, 1979, Pat. No. 4,245,507.

[51] Int. Cl.³ .......................... G01J 5/00; G01J 9/00; G01K 11/20
[52] U.S. Cl. .................................. 374/129; 250/340; 356/44; 374/159; 374/131
[58] Field of Search ........... 73/355 R; 250/461, 458.1; 351/96.29; 356/44; 374/159, 121, 130, 129; 313/475, 474; 315/149

[56] References Cited

U.S. PATENT DOCUMENTS

| | | | |
|---|---|---|---|
| 2,551,650 | 5/1951 | Urbach | 73/355 R |
| 3,352,156 | 11/1967 | Beitz | 356/43 X |
| 3,482,448 | 12/1969 | Gaffard | 356/43 X |
| 4,075,493 | 2/1978 | Wickersheim | 374/159 X |
| 4,081,215 | 3/1978 | Penny et al. | 374/121 X |
| 4,215,275 | 7/1980 | Wickersheim | 374/137 |
| 4,223,226 | 9/1980 | Quick et al. | 374/159 X |
| 4,245,507 | 1/1981 | Samulski | 356/44 X |
| 4,367,040 | 1/1983 | Kaisha | 356/44 |
| 4,374,328 | 2/1983 | Tekippe et al. | 374/129 X |
| 4,376,890 | 3/1983 | Engström et al. | 250/227 |

FOREIGN PATENT DOCUMENTS 2064107 6/1981 United Kingdom ................ 374/131

OTHER PUBLICATIONS

"Note on the Behaviour of Zinc Sulphide Phosphors Under Periodic Excitation", by Mary P. Lord et al., pp. 280-1017, Oct. 16, 1945, Proceedings of the Physical Society of London (vol. 58).

Publ. "Calcium Sulfide", definition on p. 196 of The Merck Index, 1968, Eighth Edition.

Publ. "Recent Advances in Optical Temperature Measurement", by K. A. Wickersheim and R. B. Alves (eight pages) (12/1979), Luxtron Corp.

*Primary Examiner*—Daniel M. Yasich
*Attorney, Agent, or Firm*—Majestic, Gallagher, Parsons and Siebert

[57] ABSTRACT

A thermometry system utilizes the thermally sensitive time dependent emission properties of luminescent materials. In one embodiment the system includes a probe constructed with an optic fiber bundle for conducting light both toward and away from the temperature sensitive luminescent element located at one end of the optic fiber bundle, a source for transient and/or modulated excitation of the temperature sensitive element, and a light responsive detection element located at the output end of the optic fiber bundle for detecting the transient and/or modulated light emissions by the luminescent temperature sensitive element. The emission signal received by the light responsive detector can be analyzed in a well defined manner to determine the temperature of the luminescent element and of any materials in thermal equilibrium with the luminescent material. The temperature sensitive probe can be constructed of non-metallic materials, utilized physical phenomenon which are not affected by electromagnetic (EM) fields over a wide range of field strengths and frequencies and thus has application in special circumstances, eq. temperature measurement in biological materials while such tissue is being irradiated with microwaves.

29 Claims, 4 Drawing Figures

LUMINESCENT DECAY TIME TECHNIQUES FOR TEMPERATURE MEASUREMENT

CROSS-REFERENCE TO RELATED APPLICATION

This is a continuation-in-part of application Ser. No. 73,841, filed Sept. 10, 1979, now U.S. Pat. No. 4,245,507, issued Jan. 20, 1981.

BACKGROUND OF THE INVENTION

The intrinsic thermal properties of luminescent materials (spectral characteristics, relative quantum efficiency, decay lifetime) have important advantages when used as parameters to measure or infer temperature. A large variety of luminescent materials offer good chemical and physical stability, relatively well defined absorption and emission frequency spectra, and intrinsic temperature calibration that is established at the time of chemical synthesis. All of these qualities are conducive to the design and construction of a thermometry system which can include easily interchangeable and potentially disposable thermometer probes—a definite advantage for medical usages. Wickersheim (U.S. Pat. No. 4,075,493) has described a luminescent thermometry system utilizing special phosphors which derive their intrinsic calibration through the ratio of two spectrally distinct emission bands which have separate temperature dependent emission intensities. The use of a system based on a single emission band as well as the time dependent emission properties of luminescent materials for temperature measurement is shown and claimed in a aforementioned copending application now U.S. Pat. No. 4,245,507 ). This patent is incorporated herein by reference in its entirety. The invention disclosed within the present application is unique because it allows the determination of temperature via an intrinsic luminescent property, i.e., characteristic changes in the time dependent emission processes of light emitted in one wavelength band. In practice this can be accomplished using a time varying excitation source and a single detector detecting in one wavelength band. Additionally, this technique can be accomplished using sensitive luminescent materials that are photo-excited with light in the visible rather than ultraviolet wavelengths—an advantage wtih regard to light signal propogation and attenuation in optic fiber bundles.

SUMMARY OF THE INVENTION

The present invention is addressed to a thermometry system which uses the time dependent emission properties of luminescent materials as a sensitive parameter for the measurement of temperature. One embodiment of the present invention consists of a non-metallic probe suitable for measuring temperature in an electromagnetic (EM) environment (e.g. microwave field) where conventional thermometers are inhibited. Such a thermometer probe has specific application in biological research which seeks to investigate both thermal and non-thermal effects of non-ionizing EM radiation on living tissues. In addition, a suitably configured and calibrated probe may in turn be used to determine, through inverse thermometic techniques, the strength of an EM field to which it is exposed.

A probe is configured having at least one distinct group of optical fibers for conducting light between one end thereof and the other. Proximate one end of the optic fiber bundle there is located an appropriate sensitive luminescent element having transient (time dependent) light emission properties which are temperature dependent. The probe includes a source for the transient and/or time modulated excitation of the temperature sensitive luminescent material and a light responsive detection element located at the other end of the optic fiber bundle from the sensitive luminescent element. This light responsive detection element is employed to detect the transient and/or modulated light emission response emitted by the sensitive element which is passed through the optic fiber bundle.

It is therefore a primary feature and an object of the present invention to provide a thermometry technique based on the thermally sensitive time dependent emission processes of luminescent materials.

It is another object and feature of the present invention to use the vector nature (e.g. two or more components) of time emission response to provide an intrinsic parameter which can be related to the temperature of an appropriate luminescent material which has been appropriately excited.

It is another object of the present invention to use the vector nature (e.g. two or more components) of the time emission response in a manner such that one component is used to normalize the emission response thereby allowing another component to provide an intrinsic parameter which can be related to the temperature of the luminescent material.

It is another object of the present invention to provide a non-metallic thermometer probe suitable for implantation in a material in which temperature is to be measured.

It is yet another object of the present invention to provide a means of determining temperature through an analysis (signal processing) of the transient emission response of a suitable luminescent material which has been excited via a transient excitation pulse.

It is yet another object of the present invention to provide a means for determining temperature through an analysis (signal processing) of the modulated emission response of a suitable luminescent material which is being excited via a modulated excitation source. The signal analysis or processing may include the vector resolution of the modulated emission signal into a component at 0° phase relative to the modulated excitation source, and component at 90° phase relative to the modulated excitation source. Each component separately relating information concerning the temperature sensitive time dependent emission properties of the luminated material. An alternative means of signal analysis may include resolving an appropriately modulated emission signal into a periodic time varying (AC) component and into a steady state (DC) component. Each component separately carries information related to the temperature sensitive time dependent emission properties of the luminescent material.

Other objects and features of the present invention will, in part, be obvious and will, in part, become apparent as the following description proceeds. The features of novelty which characterize the invention will be pointed out with particularity in the claims annexed to and forming part of the specification.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description when read in conjunction with the accompanying drawings where:

DETAILED DESCRIPTION OF THE DRAWINGS

Figure 1:
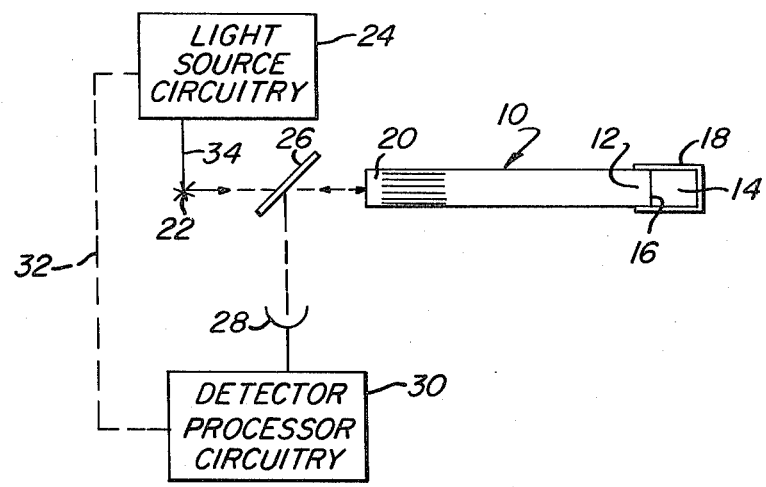
FIG. 1 is a schematic representation of one embodiment of the temperature probe system of the present invention.

Looking to FIG. 1, there is shown in schematic form a temperature probe 10 and associated mechanisms for operating the same. The probe consists of a bundle of optical fibers having any convenient and reasonable desired diameter, length and number. Provided adjacent to the terminus of the optical bundle at one end 12 is a temperature sensing element 14 which has luminescent properties. An optical bundle of optical fibers is only one example of light transference/transmittance techniques, the others being well known in the optical art. The temperature sensing element 14 may be a fluorescent material or may be a phosphorescent material or suitable combinations of such materials. Applicant has found that the temperature sensitive element 14 may take a number of specific embodiments, however, calcium sulfide activated with Europium and tin has been found to have suitable time dependent temperature sensitive luminescent emission properties in order to demonstrate the operability of this invention. The temperature sensitive element 14 is attached to the end 12 of the optical fiber bundle by a clear adhesive (e.g. epoxy resin) 16 and includes about its periphery an opaque encapsulation of an opaque material 18 for excluding any ambient or extraneous light. Proximate the other end 20 of the optic fiber bundle 10 is located a source for the transient or modulated photo-excitation of the temperature sensitive luminescent element 14. The source 22 may take any one of a number of configurations, however, applicant has found that a xenon flash lamp provides sufficient transient optical excitation and a mercury discharge lamp chopped with a mechanical light chopper provides sufficient modulated optical excitation for the purpose of the present invention. The source 22 is controlled, both as to its triggering or modulation frequency by an appropriate electronic circuit 24 through appropriate line circuitry as at 34. The specific electronic circuitry involved therein, is not unique and is commonly available with state of the art electronics and will not be discussed herein. A beam splitter 26 is provided along the optical path between the source of illumination and the end of the optical fiber bundle 20. The beam splitter may take any one of several configurations including a bifurcated optic fiber bundle with a common terminus appropriately connected to the end 12 of the probe with one separated end directing light from the source 22 and the second separated end directing light emission from the sensitive element toward a light responsive detector 28. The beam splitter is employed for separating the incoming excitation illumination from the outcoming luminescent response from the sensitive element. Corrugated light wave guides, dichroic filters and partially silvered mirrors and spectral filters are examples of such alternatives.

Due to the nature of the luminescent process, excitation light radiation is different in frequency from the luminescent emission; a single fiber can be used in the design of the temperature probe. Located proximate the beam splitter 26 is a light responsive detector element which is adapted to sense the light emitted by the temperature sensitive element 14 and which is passed through the optical bundle 10. The specific configuration of the light responsive element 28 is one of design. Applicant has found that a photomultiplier tube or photosensitive diode, commonly available, serves well as a light detector. The circuitry and electronics necessary for receiving the current or voltage response from the detector element 28 is shown as detector circuitry and signal processor 30 the specific configuration of which depends upon the signal processing technique used in a convenient design. For example, if a transient pulse will be analyzed to determine the temperature of the sensitive element, detection circuitry will include timing gate(s) and may require triggering information communicated from the source via an electrical line 32. If a modulated signal technique is used to determine the temperature of the sensitive element 14, detection circuitry may include phase sensitive detection elements, frequency locked amplifiers and may require phase/frequency reference information communicated from the source via an electrical line 32.

If a modulated signal technique is used to determine the temperature of the sensitive element and the respective emission signal is resolved into an AC signal and DC signal, detector circuitry may include an automatic gain control element which will use negative feedback to keep one component (e.g. the DC component) of the signal at a fixed predetermined level. In so doing, the other (AC) component of the signal will be intrinsically normalized and can be used for temperature determination. An alternative might include using the DC signal for a negative feed back loop to adjust the intensity of the modulated source. In so doing, the AC component of the composite signal will again be intrinsically normalized and useful for temperature determinations.

In a crystalline luminescent material, the electronic energy configuration is such that there exist energy bands consisting of sets of semicontinuous energy levels which are accessible to electrons within the lattice structure. Separting the energy bands are forbidden regions, band gaps, which consist of energy states which are not allowed levels for the lattice electrons. A luminescent process consists of an excitation of a lattice electron across the energy band gap from a lower energy (valence) band to a higher energy (conduction) band. The excited electron subsequently makes relatively rapid non-radiative transitions between the semicontinuous set of allowed energy levels within the conduction band toward the lower most levels of the band and then makes a final radiative (light emitting) transition across the band gap back into the lower valence band. Since some of the initial absorbed excitation energy is dissipated in non-radiative transitions within the conduction band, the final radiative (light emitting) transition is a photon emission of lower energy than the initial excitation energy. If the initial absorption process involves photo excitation, the light emission is of lower frequency than the light absorbed. In this respect luminescence is not a photo reflective process.

Modifications of the luminescent process occur with the addition of lattice defects and/or chemical impurities into luminescent material. In some cases an impurity embedded within the crystal lattice forms a transition pathway through which an excited electron can make a radiative energy band gap transition. In so doing, the radiative transition which takes place at the site of the lattice impurity has spectral properties associated with the atomic transition properties of the impurity and such an impurity is termed an activator or luminescent center. Generally, the transition through the activator is between energy levels which lie within the band gap. These accessible energy levels within the forbidden gap have been introduced by the activator impurity.

Other impurities or lattice defects may also introduce accessible energy levels within the band gap. However, because of quantum mechanical selection rules, a transition from such a level to the lower valence band is forbidden. Such an impurity level is termed an energy trap or trapping center. An excited electron which falls into an energy trap must first escape the trap before making the final radiative transition to the lower valence energy band. The energy needed to escape a lattice trap can be supplied to the trapped electron by means of thermal vibrations within the lattice structure. Consequently, for excited electrons which have fallen into energy traps there is a time delay process associated with the photo emission transition between energy bands or through a luminescent center. This time delay (decay time, or lifetime) is dependent on the temperature of the luminescent material. It is not uncommon to find luminescent materials which exhibit long decay times—an after glow lasting hours after the initial excitation in certain temperature ranges.

Another aspect of the crystalline luminescent process worthy of note is the fact that, in addition to the radiative transition pathways through a luminescent center, there exist non-radiative vibrational relaxation pathways by which the excited electron may return to the lower valence band. This vibrational relaxation (quenching) is related to the luminescent or quantum efficiency of the material. The quenching process is a thermally activated process which competes with the luminescent radiation transition. It is the relative probability for non-radiative and radiative electron transitions which is a measure of the quantum efficiency of the luminescent material.

Now consider a description of a mechanism which can exist in a luminescent material which lends itself convenient in the design of a luminescent thermometry system. A luminescent material has two types of energy traps and one luminescent center. One set of traps is shallow. That is, the thermal energy required to escape these traps is small and is readily available at lower lattice temperatures. The second set of traps is deep. That is, the thermal energy required to escape these traps is large and is not readily available at low lattice temperatures. At low temperatures an excited electron has a high probability for following a transition pathway through the set of shallow energy traps making a final radiative emission at the site of the luminescent center. The probability for following a transition pathway through the set of deep traps is small due to the fact that once falling in a deep trap the electron is essentially trapped indefinitely since the probability of thermal escape is small. The decay lifetime of such a material at low temperatures will thus be dominated by the characteristic (relatively short) lifetime associated with the transition pathway through the shallow traps. Increasing the temperature of the material increases the availability of thermal energy for escaping the set of deep traps. Consequently, the decay lifetime associated with the luminescent process will be a composite function of decay times corresponding to transition pathways made through both shallow and deep traps. It is clear that the probabilities for an electron to follow a transition pathway through the sets of shallow and deep traps and the lifetimes associated with these respective pathways are intrinsic temperature dependent properties of the luminescent material. An analysis of the time dependent emission response in terms of the two components, fast and slow, allows an intrinsic means for temperature determination of the luminescent sample. The description can be extended to materials which have many sets of traps at varying levels of concentration and an associated multicomponent time emission response properties. In particular the shallow traps or fast transition pathway, may be a metastable state of the luminescent center. The temperature sensitivity and range of such materials can be varied by choosing trap energies (i.e. type of impurities) and concentration within the luminescent material.

There are several techniques for measuring the multicomponent (e.g. fast, slow transition probabilities) properties of the time dependent emission response of a luminescent material. The particular technique is one of convenience.

Figure 2:
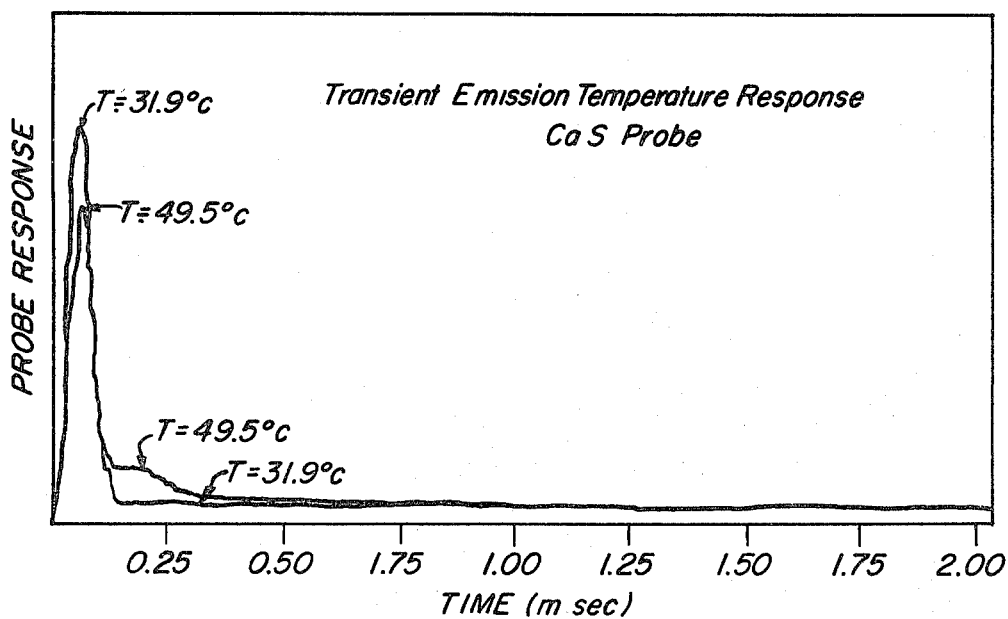
FIG. 2 is a graphic representation of temperature response of one embodiment of the present temperature probe based upon transient emission.

One technique would be by direct analysis of the decay response after excitation with a short light pulse. A short pulse is one which has transient parameters (e.g. rise-time, fall-time, duration) which are much shorter than the characteristic rise and decay times of the luminescent material. Looking to FIG. 2, there is shown an example of this technique which uses a calcium sulfide material activated with Europium. The emission response consists of a narrow peak and long decay tail. The emission tail is due to slow transition pathways. Emission in the narrow peak is predominently due to fast transition pathways. When the temperature of the material is changed, the relative amount of light emitted via the fast and slow pathways changes accordingly. At a higher temperature, the height of the narrow peak decreases where the height of the tail increases. This implies that the relative probability for electron transition through a fast or slow pathway has changed such that at higher temperature the probability for transition through a slow pathway is increased and the probability for transition through the fast pathway is lowered. An analysis of the total emission response in terms of the intensity in the peak and the intensity in the tail is therefore related to the intrinsic probability for fast and slow decay and is thus related intrinsically to the temperature of the sample. For this technique, the ratio of emission intensity in the peak to that in the tail (or some region of the tail) would be useful as an intrinsic temperature indicating parameter for a luminescent thermometry system. For this particular calcium sulfide sample, the total integrated intensity varies little with temperature in the range from 0° to 50° C. That is, under constant illumination the change in intensity as a function of temperature is small (i.e. the quantum efficiency is nearly constant). One portion of the detecting and analysis/processor element 30 employed in this embodiment of the invention might involve a transient pulse recorder such as that manufactured by Biomation, Inc. (Model 802 recorder).

Figure 3:
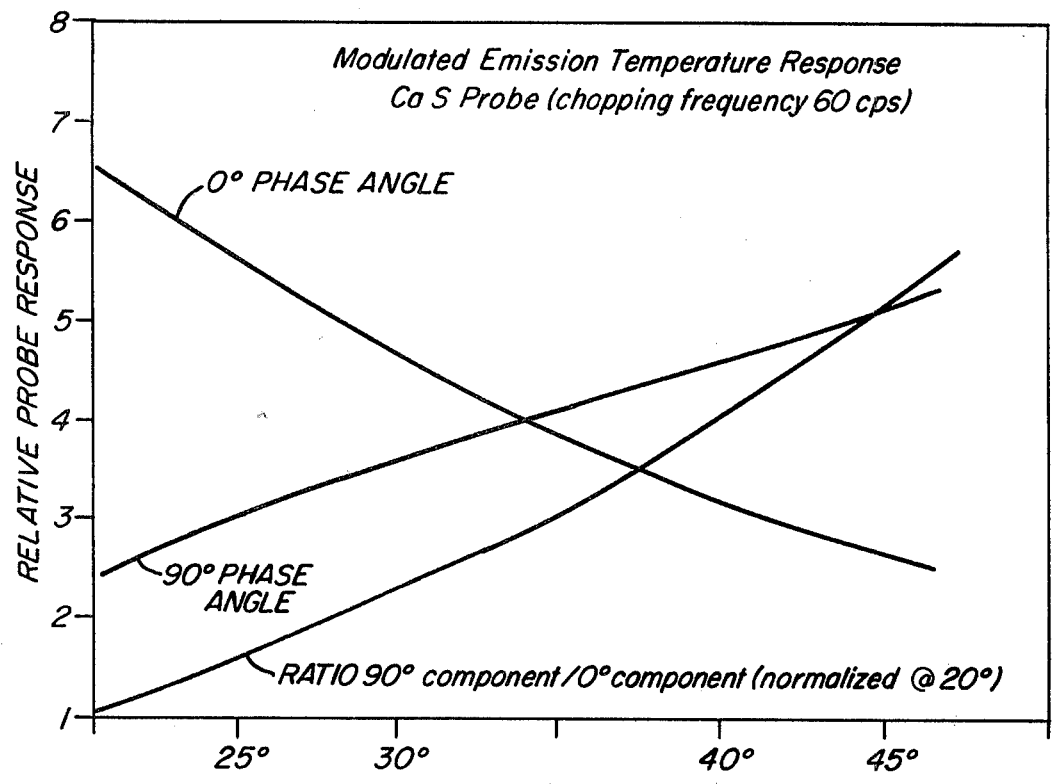
FIG. 3 is a graphic representation of temperature response of one embodiment of the present temperature probe based upon modulated emission.

A second technique for measuring parameters related to the probabilities for fast and slow transition pathways uses a set of rapid excitation pulses, i.e. a modulated excitation source, to excite the luminescent material. (periodically modulated excitation radiation) A modulation frequency for the source is chosen such that the period is long relative to the characteristic lifetime associated with the fast transition pathway, yet still short enough such that slow transition pathway emissions will exhibit emission modulations. Luminescent emission via the slow pathways will follow in frequency the modulations of the excitation source. However, this emission will be shifted in phase by an amount related to the ratio of the period of the source modulation and the characteristic lifetime associated with the slow transition pathway. The resulting composite modulated emission signal can be analyzed in terms of a component that is in phase with the source and a component that is 90° out of phase with the source. At very low temperature the emission signal will be due to the fast transition pathway and will be in phase with the excitation source. There will be no measured component at 90° quadrature. As the temperature increases, the appearance of an emission signal at 90° quadrature is indicative of the probability for transition via slow pathways. Consequently, the ratio of signal intensity components at 0° phase and 90° phase relative to the excitation source is an intrinsic temperature dependent parameter which can be used in the design of a luminescent thermometry system. FIG. 3 represents the phase decomposition of a signal response from the calcium sulfide material excited with a modulated light source. With increasing temperature, the magnitude of the 0° phase component decreases while the magnitude of the 90° phase component increases indicating the relative change in the intrinsic probability for electron transition via fast and slow decay pathways. The ratio of these two components can be useful as an intrinsic temperature indicating parameters for a luminescent thermometry system. Detection may be accomplished by a phase sensitive lock in amplifier (phase locking means) manufactured by Princeton Applied Research, Inc. (Model 128A).

A third and relatively simple technique for measuring a parameter that is related to the intrinsic probability for fast or slow transitions consist of using a modulated excitation source as mentioned above. (periodically modulated excitation radiation) In this case, however, the modulation frequency is chosen such that its period is long relative to the characteristic lifetime associated with the fast transition pathway but relatively short with respect to the characteristic lifetime associated with the slow transition pathway.

Figure 4:
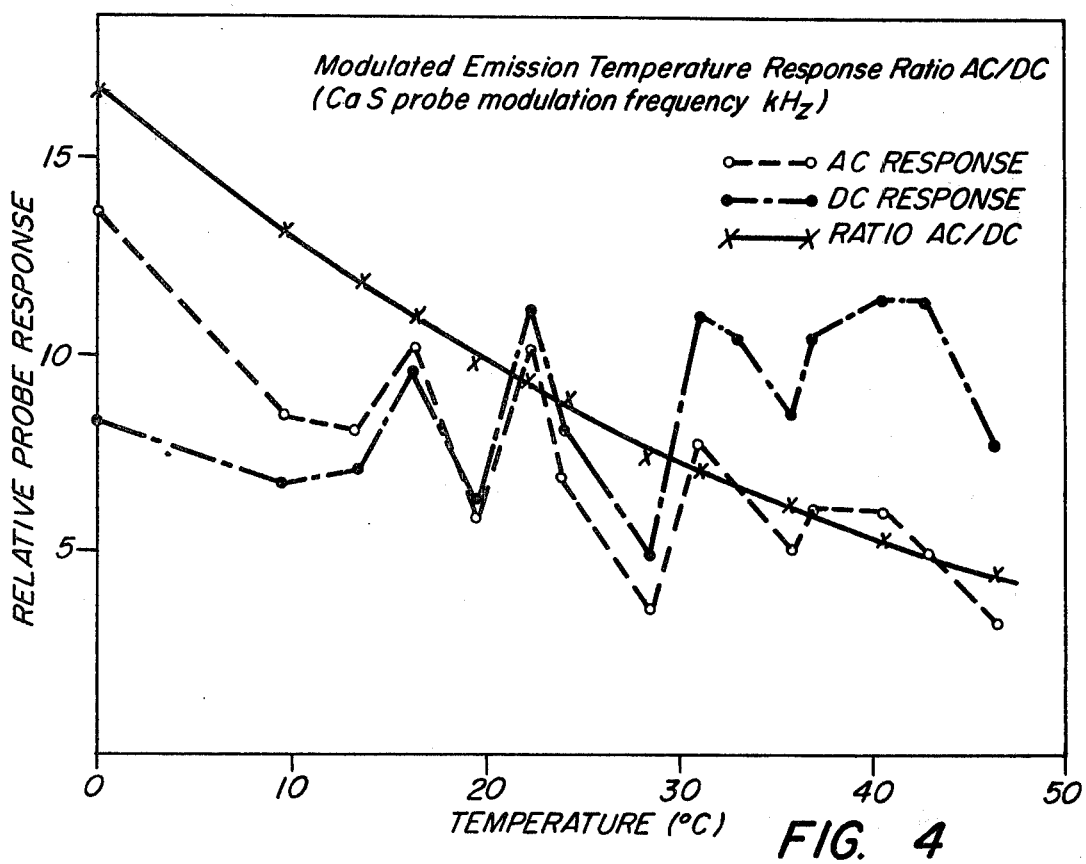
FIG. 4 is a graphic representation of temperature response of one embodiment of the present temperature probe based upon a modulated emission ratio of alternating current versus direct current.

Under these circumstances the fast transition pathway emissions will follow in frequency and nearly in phase the excitation source modulations. However, the slow transition pathway emission are too slow to follow the modulations of the excitation source. Therefore the emission signal associated with the slow transition pathway constitutes a steady state (not time varying) background. The composite emission response (which may be detected by ordinary AC/DC voltmeter measurement techniques) consists of a modulated emission intensity superimposed on an unmodulated steady state background intensity. When converted to a voltage or current signal by the optic electric detector 28 and 30 the signal will consist of an AC signal superimposed on a DC signal. The AC signal carries information with regard to the transition probability via the fast pathway and the DC signal carries information with regard to the transition probability via the slow pathway. The ratio of the AC component to the DC component of the signal will be an intrinsic temperature dependent parameter useful in the design of a luminescent thermometry system. FIG. 4 shows data measured using the above described technique. For each data point the probe has been interchanged and as a result the composite AC-DC response is seen to vary significantly in magnitude giving no clear indication of thermal dependency. However, we see that the ratio of the AC to DC response exhibits a smoothly decreasing function of temperature. This intrinsic normalization technique demonstrates the possibility of interchanging temperature probes without system recalibration and potential for intrinsically calibrated disposable probes.

In conclusion, it is seen that there is provided a simple effective and easily maintained thermometry system consisting of a temperature probe which may be used in a non-ionizing electromagnetic radiation field. The temperature probe is constructed with a non-conductive (dielectric) material and, therefore, is non-interfering and non-perturbing of the electromagnetic field. The probe can be adapted and calibrated in turn to determine, via thermometric means, the strengths of an electromagnetic field to which it is subjected. The thermometry system will utilize the time dependent emission properties of luminescent material for temperature determinations. A multi-component time dependent emission response of a suitable material allows relatively simple signal processing techniques, e.g., ratio of AC and DC components of a composite modulated signal. The intrinsic nature of the response implies intrinsic temperature calibration and allows simplicity in probe construction, insensitivity of the response to optical coupling between source, luminescent material and detector, and convenience in interchanging probes as well as cost effective disposable probes.

While certain changes may be made in the above noted apparatus without departing from the scope of the invention herein involved, it is intended that all material contained in the above description or shown in the accompanying drawings whall be interpreted as illustrative and not in a limiting sense.

I claim:

1. A temperature probe comprising:
   an optical fiber bundle having at least one optical fiber;
   a temperature sensitive luminescent element having time dependent light emission properties having at least two different time emission components, said temperature sensitive element being attached at one end of said bundle and being adapted to be implanted in such material whose temperature is to be measured;
   light source located proximate the other end of said bundle, said light source having a given frequency spectrum for transient excitation of said temperature sensitive luminescent element;
   means proximate said other end for separating the light passed from said source toward said temperature sensitive element from that being emitted from said temperature sensitive element; and
   light responsive detection and analysis means located proximate said other end of said bundle, said light responsive detection means including means for detecting and analyzing said at least two different time emission components emitted by said temperature sensitive luminescent element as a function of the change in temperature of said temperature sensitive element.

2. The temperature probe according to claim 1 wherein said light responsive detection and analysis means ratios the transient emission intensity of two of said at least two different time emission components, such ratio being intrinsically temperature dependent.

3. The temperature probe according to claim 2 wherein said temperature sensitive luminescent element is a phosphorescent material.

4. The temperature probe according to claim 3 wherein said phosphorescent material is calcium sulfide activated with Europium.

5. A temperature probe comprising:
an optical fiber bundle having at least one optical fiber;
a temperature sensitive luminescent element having time dependent light emission properties having at least two different time emission components, said temperature sensitive element being located at one end of said bundle and being adapted to be implanted in such material whose temperature is to be measured;
light source located proximate the other end of said bundle, said light source having a given frequency spectrum for modulated excitation of said temperature sensitive luminescent element;
means proximate said other end for separating the light passed from said source toward said temperature sensitive element from being emitted from said temperature sensitive element; and
light responsive detection and analysis means located proximate said other end of said bundle, said light responsive detection means including means for detecting and analyzing said at least two different time emission components emitted by said temperature sensitive luminescent element as a function of the change in temperature of said temperature sensitive element.

6. The temperature probe according to claim 5 wherein said light responsive detection and analysis means ratios the modulated intensity of two of said at least two different time emission components, such ratio being intrinsically temperature dependent.

7. The temperature probe according to claim 6 wherein said at least two different time emission components are detected by means of a phase sensitive detection technique which differentiates between a component which is in phase with said modulated source and a component which is ninety (90) degrees out of phase with said modulated source, said ratio of said component in phase etc. and said component 90° out of phase with said modulated source being intrinsically temperature dependent.

8. The temperature probe according to claim 7 wherein said temperature sensitive luminescent element is a phosphorescent material.

9. The temperature probe according to claim 8 wherein said phosphorescent material is calcium sulfide activated with Europium.

10. The temperature probe according to claim 5 wherein one of said at least two different time emission components is modulated and another of said at least two different time emission components is unmodulated.

11. The temperature probe according to claim 10 wherein said light responsive detection and analysis means ratios said modulated component with said unmodulated component, said ratio being intrinsically temperature dependent.

12. The temperature probe according to claim 11 wherein said modulated component is an AC signal and said unmodulated component is a DC signal.

13. The temperature probe according to claim 12 wherein said temperature sensitive luminescent element is a phosphorescent material.

14. The temperature probe according to claim 13 wherein said phosphorescent material is calcium sulfide activated with Europium.

15. A method of measuring temperature, comprising the steps of:
positioning luminescent material in thermal communication with said environment, said luminescent material being characterized by emitting, when excited with transient illumination radiation, a pulse having at least two components with different rates of intensity decay, an initial rapidly decaying component and a subsequent slowly decaying component which continue in time beyond termination of said excitation radiation, the time rates of decay of each of said components varying differently as a function of temperature,
directing said transient illumination radiation against said luminescent material, thereby exciting it to luminesce with said at least two component radiation pulse,
detecting the luminescence in each of said at least two components of said pulse, and
comparing the detected component luminescence, thereby to determine the temperature of said luminescent material and said environment.

16. A system for measuring temperature, comprising:
means containing luminescent material for being positioned in an environment whose temperature is to be measured, said luminescent material being characterized by emitting, when excited by transient illuminating radiation, luminescent radiation that continues in time beyond termination of the excitation radiation and with a rate of intensity decay that is related to the temperature of the luminescent material,
means including a source of light radiation for directing luminescent material excitation radiation against said luminescent material, said illuminating means including means for modulating the intensity of the illumination at a given periodic rate prior to its striking the luminescent material,
means for detecting the luminescent material luminescent radiation and producing an electrical signal proportional thereto,
means receiving said electrical signal for analyzing the signal to obtain two quantities that are independently related to the luminescent material rate of decay, and
means for comparing the two quantities, thereby to determine the temperature of the luminescent material.

17. A method of measuring temperature, comprising the steps of:
positioning a quantity of luminescent material in thermal communication with said environment, said luminescent material characterized by emitting, when excited by transient illumination radiation, luminescent radiation that continues in time beyond termination of the excitation radiation and with a rate of intensity decay that is related to the temperature of the luminescent material, illuminating said luminescent material with periodically modulated excitation radiation, thereby exciting it to luminesce with intensity variations, analyzing said luminescent intensity variations into two signal components having a locked phase difference, and comparing the two signal components, whereby the comparison provides a quantity related to the rate of decay of the luminescent material and thus also to the temperature of the luminescent material and said environment.

18. The method according to claim 17 wherein said luminescent material is additionally characterized by its said luminescent radiation including a pulse having at least the two components with different rates of decay, an initial rapidly decaying component and a subsequent slowly decaying component, the rates of decay of each of said components varying differently as a function of temperature.

19. The method according to claim 17 wherein the step of analyzing the luminescent intensity variations includes phase locking said two signal components to the periodically modulated excitation radiation, and causing said locked phase difference to be equal to substantially 90 degrees.

20. The method according to claim 19 wherein said luminescent material is additionally characterized by its said luminescent radiation including a pulse having at least the two components with different rates of decay, an initial rapidly decaying component and a subsequent slowly decaying component, the rates of decay of each of said components varying differently as a function of temperature.

21. A method of measuring temperature, comprising the steps of:

positioning a quantity of luminescent material in thermal communication with said environment, said luminescent material characterized by emitting, when excited by transient illumination radiation, luminescent radiation that continues in time beyond termination of the excitation radiation and with a rate of intensity decay that is related to the temperature of the luminescent material, illuminating said luminescent material with periodically modulated excitation radiation, thereby exciting it to luminesce with periodic intensity variations, analyzing the emitted radiation intensity variations to detect one periodic intensity component thereof and an average intensity component thereof, and comparing said periodic and average intensity components, whereby the comparison provides a quantity related to the rate of decay of said luminescent material and thus also to the temperature of the luminescent material and of said environment.

22. The method according to claim 21 wherein the step of illuminating said luminescent material includes causing the period of the modulated excitation radiation to be short relative to the characteristic decay time of the luminescent material such that the luminescent material emits some minumum radiation intensity at all times.

23. A method of measuring temperature, comprising the steps of:

positioning a quantity of luminescent material in thermal communication with said environment, said luminescent material characterized by emitting, when excited by transient illumination radiation, luminescent radiation that continues in time beyond termination of the excitation radiation and with a rate of intensity decay that is related to the temperature of the luminescent material, illuminating said luminescent material with periodically modulated excitation radiation, thereby exciting it to luminesce with periodic intensity variations, analyzing the emitted radiation intensity variations to obtain two quantities that vary differently as a function of the luminescent material rate of decay, and comparing the two quantities, whereby the comparison provides a quantity related to the rate of decay of said luminescent material and thus also to the temperature of the luminescent material and of said environment.

24. A system for measuring temperature, comprising:

means containing luminescent material for being positioned in an environment whose temperature is to be measured, said luminescent material being characterized by emitting, when excited by transient illuminating radiation, a pulse of radiation having at least two components with different rates of intensity decay, an initial rapidly decaying component and a subsequent slowly decaying component which continue in time beyond termination of said excitation radiation, the rates of decay of each of said components varying differently as a function of temperature, means including a source of light radiation for directing transient illuminating radiation against said luminescent material, means for detecting the luminescent material luminescent radiation and producing an electrical signal proportional thereto, and means receiving said signal for comparing the rates of decay of said at least two emitted pulse components, thereby to determine temperature of the luminescent material.

25. A system for measuring temperature, comprising:

means containing luminescent material for being positioned in an environment whose temperature is to be measured, said luminescent material being characterized by emitting, when excited by transient illuminating radiation, luminescent radiation that continues in time beyond termination of the excitation radiation and with a rate of intensity decay that is related to the temperature of the luminescent material, means including a source of light radiation for directing luminescent material excitation radiation against said luminescent material, said illuminating means including means for modulating the intensity of the illumination at a given periodic rate prior to its striking the luminescent material, means for detecting the luminescent material luminescent radiation and producing an electrical signal proportional thereto, means receiving signals from said detector and from said modulating means for analyzing said detector signal into two time varying signals having a fixed phase relationship with each other and phase locked to the modulating signal, and means receiving the two fixed phase signals for comparing them, thereby to determine the temperature of the luminescent material.

26. The system according to claim 25 wherein said fixed phase relationship of the analyzing means is substantially 90 degrees.

27. The system according to claim 25 wherein said luminescent material is additionally characterized by its said luminescent radiation including a pulse having at least two components with different rates of decay, an initial rapidly decaying component and a subsequent slowly decaying component, the rates of decay of each of said components varying differently as a function of temperature.

28. A system for measuring temperature, comprising:
means containing luminescent material for being positioned in an environment whose temperature is to be measured, said luminescent material being characterized by emitting, when excited by transient illuminating radiation, luminescent radiation that continues in time beyond termination of the excitation radiation and with a rate of intensity decay that is related to the temperature of the luminescent material,
means including a source of light radiation for directing luminescent material excitation radiation against said luminescent material, said illuminating means including means for modulating the intensity of the illumination at a given periodic rate prior to its striking the luminescent material,
means for detecting the luminescent material luminescent radiation and producing an electrical signal proportional thereto,
means receiving signals from said detector and from the modulating means for extracting from said detector signal a first component thereof that is a time varying signal and a second component thereof that is an average signal, and
means receiving said first and second signals for comparing them, thereby to determine the temperature of said luminescent material.

29. The system according to claim 28 wherein said modulating means includes means for modulating the excitation radiation at a frequency that is high enough relative to the characteristics of the luminescent material such that the luminescent material emits some minimum radiation intensity at all times.

* * * * *